United States Patent
Yoshida et al.

(10) Patent No.: US 9,816,565 B2
(45) Date of Patent: Nov. 14, 2017

(54) CAGE FOR CONSTANT VELOCITY UNIVERSAL JOINT, FIXED TYPE CONSTANT VELOCITY UNIVERSAL JOINT INCORPORATING SAME, AND DRIVE SHAFT INCORPORATING SAID FIXED TYPE CONSTANT VELOCITY UNIVERSAL JOINT

(71) Applicants: Kazuhiko Yoshida, Shizuoka (JP); Masafumi Osugi, Shizuoka (JP); Kenta Yamazaki, Shizuoka (JP); Masato Chokyu, Shizuoka (JP); Rikuou Takagi, Shizuoka (JP)

(72) Inventors: Kazuhiko Yoshida, Shizuoka (JP); Masafumi Osugi, Shizuoka (JP); Kenta Yamazaki, Shizuoka (JP); Masato Chokyu, Shizuoka (JP); Rikuou Takagi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 251 days.

(21) Appl. No.: 14/419,104

(22) PCT Filed: Aug. 1, 2013

(86) PCT No.: PCT/JP2013/070898
§ 371 (c)(1),
(2) Date: Feb. 2, 2015

(87) PCT Pub. No.: WO2014/021428
PCT Pub. Date: Feb. 6, 2014

(65) Prior Publication Data
US 2015/0204386 A1    Jul. 23, 2015

(30) Foreign Application Priority Data

Aug. 3, 2012   (JP) ................................. 2012-172598
Apr. 25, 2013  (JP) ................................. 2013-092558

(51) Int. Cl.
*C22C 38/02* (2006.01)
*C22C 38/04* (2006.01)
(Continued)

(52) U.S. Cl.
CPC ............... *F16D 3/223* (2013.01); *C21D 1/06* (2013.01); *C21D 9/0068* (2013.01); *C21D 9/40* (2013.01);
(Continued)

(58) Field of Classification Search
None
See application file for complete search history.

(56) References Cited

U.S. PATENT DOCUMENTS

| 4,317,355 A | 3/1982 | Hatsuno et al. |
| 2001/0002369 A1* | 5/2001 | Kobayashi .............. B23P 15/00 464/145 |

(Continued)

FOREIGN PATENT DOCUMENTS

| EP | 1 715 208 | 10/2006 |
| JP | 5-331616 | 12/1993 |

(Continued)

OTHER PUBLICATIONS

Machine—English translation of JP2009-191901, Kobayashi Masazumi, Aug. 27, 2009.*

(Continued)

*Primary Examiner* — Deborah Yee
(74) *Attorney, Agent, or Firm* — Wenderoth, Lind & Ponack, L.L.P.

(57) ABSTRACT

Provided is a cage (5, 65, 95) for a constant velocity universal joint, which is formed into a ring shape with a substantially uniform thickness, including a plurality of pockets (20, 80, 110) formed in a circumferential direction of the cage (5, 65, 95), for receiving torque transmitting (Continued)

balls, respectively, the cage (5, 65, 95) being formed of carbon steel including 0.41 to 0.51 mass % of C, 0.10 to 0.35 mass % of Si, 0.60 to 0.90 mass % of Mn, 0.005 to 0.030 mass % of P, and 0.002 to 0.035 mass % of S, with the balance being Fe and an element inevitably remaining at the time of steelmaking and refining, the cage (5, 65, 95) being subjected to carburizing, quenching, and tempering as heat treatment, each of the plurality of pockets (20, 80, 110) having a side surface (23, 83, 113) finished after the heat treatment.

9 Claims, 12 Drawing Sheets

(51) Int. Cl.
- C21D 9/36 (2006.01)
- C23C 8/20 (2006.01)
- C23C 8/00 (2006.01)
- F16D 3/223 (2011.01)
- C21D 9/40 (2006.01)
- C23C 8/22 (2006.01)
- C21D 1/06 (2006.01)
- C22C 38/20 (2006.01)
- C22C 38/22 (2006.01)
- C22C 38/28 (2006.01)
- C22C 38/32 (2006.01)
- C21D 9/00 (2006.01)

(52) U.S. Cl.
CPC .............. *C22C 38/02* (2013.01); *C22C 38/04* (2013.01); *C22C 38/20* (2013.01); *C22C 38/22* (2013.01); *C22C 38/28* (2013.01); *C22C 38/32* (2013.01); *C23C 8/00* (2013.01); *C23C 8/22* (2013.01); *F16D 2003/22303* (2013.01); *F16D 2200/0021* (2013.01); *F16D 2250/00* (2013.01)

(56) References Cited

U.S. PATENT DOCUMENTS

| | | | |
|---|---|---|---|
| 2003/0051771 A1 | 3/2003 | Nishimori et al. | |
| 2004/0261918 A1* | 12/2004 | Ando | B21J 1/02 148/649 |
| 2006/0169374 A1* | 8/2006 | Welschof | B32B 15/011 148/566 |
| 2008/0248884 A1 | 10/2008 | Ishijima et al. | |
| 2009/0060406 A1 | 3/2009 | Cremerius et al. | |
| 2009/0136287 A1 | 5/2009 | Kobayashi et al. | |
| 2010/0242564 A1 | 9/2010 | Cremerius et al. | |
| 2012/0220382 A1* | 8/2012 | Sone | F16D 3/2237 464/145 |
| 2013/0109483 A1 | 5/2013 | Yoshida et al. | |

FOREIGN PATENT DOCUMENTS

| | | |
|---|---|---|
| JP | 11-93964 | 4/1999 |
| JP | 2001-97063 | 4/2001 |
| JP | 2001-153148 | 6/2001 |
| JP | 2006-283914 | 10/2006 |
| JP | 2007-56296 | 3/2007 |
| JP | 2007-85488 | 4/2007 |
| JP | 2007-510057 | 4/2007 |
| JP | 3995904 | 10/2007 |
| JP | 2008-75779 | 4/2008 |
| JP | 2008-75780 | 4/2008 |
| JP | 2009-191901 | 8/2009 |
| JP | 2009-299146 | 12/2009 |
| JP | 2010-43691 | 2/2010 |
| JP | 2010-043691 * | 2/2010 |
| JP | 4708430 | 6/2011 |
| JP | 2011-133107 | 7/2011 |
| JP | 4731945 | 7/2011 |
| JP | 2012-52654 | 3/2012 |

OTHER PUBLICATIONS

Machine—English translation of JP2009-299146, Nishikawa Motohiro, Dec. 24, 2009.*
Machine—English translation of JP2001-097063, Watanable Yukihiro et al., Apr. 10, 2001.*
International Preliminary Report on Patentability and Written Opinion of the International Searching Authority dated Feb. 3, 2015 in International (PCT) Application No. PCT/JP2013/070898.
Office Action dated Nov. 10, 2016 in corresponding Japanese Application No. 2013-092558, with English translation.
Extended European Search Report dated Apr. 4, 2016 in counterpart European Application No. 13825627.6.
International Search Report dated Oct. 15, 2013 in International (PCT) Application No. PCT/JP2013/070898.
Communication Pursuant to Article 94(3) EPC dated May 12, 2017 in corresponding European Application No. 13 825 627.6.

* cited by examiner

CAGE FOR CONSTANT VELOCITY UNIVERSAL JOINT, FIXED TYPE CONSTANT VELOCITY UNIVERSAL JOINT INCORPORATING SAME, AND DRIVE SHAFT INCORPORATING SAID FIXED TYPE CONSTANT VELOCITY UNIVERSAL JOINT

TECHNICAL FIELD

The present invention relates to a cage for a constant velocity universal joint, a fixed type constant velocity universal joint incorporating the cage, and to a drive shaft incorporating the fixed type constant velocity universal joint.

BACKGROUND ART

Constant velocity universal joints are used in power transmission systems of automobiles, aircrafts, ships, various industrial machines, and the like. The constant velocity universal joints to be incorporated into a drive shaft, a propeller shaft, and the like for transmitting a rotational force from an engine of an automobile to wheels at constant velocity are classified into such two types as a fixed type constant velocity universal joint and a plunging type constant velocity universal joint. The two types of constant velocity universal joints have a structure capable of transmitting rotation at constant velocity even when two shafts, namely, a drive shaft and a driven shaft are coupled to each other to form an operating angle.

The drive shafts for transmitting power from the engine of the automobile to driving wheels need to allow angular displacement and axial displacement along with changes in relative positional relationship between a differential and the wheels. Thus, the drive shafts each generally include a plunging type constant velocity universal joint capable of allowing the angular displacement and the axial displacement on the differential side (inboard side), a fixed type constant velocity universal joint capable of forming a high operating angle on the driving wheel side (outboard side), and a shaft for coupling the two types of constant velocity universal joints to each other.

As an example of the fixed type constant velocity universal joint, a Rzeppa constant velocity universal joint is known. As illustrated in FIG. 15, a Rzeppa constant velocity universal joint 121 mainly includes an outer joint member 122, an inner joint member 123, torque transmitting balls 124, and a cage 125. In a spherical inner peripheral surface 128 of the outer joint member 122, a plurality of track grooves 126 are formed equiangularly so as to extend along an axial direction. In a spherical outer peripheral surface 129 of the inner joint member 123, track grooves 127 opposed to the track grooves 126 of the outer joint member 122 are formed equiangularly so as to extend along the axial direction. Each of the plurality of balls 124 for transmitting torque is incorporated between the track groove 126 of the outer joint member 122 and the track groove 127 of the inner joint member 123. The cage 125 for holding the balls 124 is arranged between the spherical inner peripheral surface 128 of the outer joint member 122 and the spherical outer peripheral surface 129 of the inner joint member 123.

The spherical inner peripheral surface 128 of the outer joint member 122 and the spherical outer peripheral surface 129 of the inner joint member 123 each have a curvature center formed at a joint center O. Further, a spherical outer peripheral surface 130 and a spherical inner peripheral surface 131 of the cage 125 each have a curvature center formed at the joint center O as well. On the other hand, a curvature center A of the track groove 126 of the outer joint member 122 and a curvature center B of the track groove 127 of the inner joint member 123 are offset in the axial direction by equal distances with respect to the joint center O. Thus, when the joint forms an operating angle, the rotation is transmitted at a constant velocity between two axes of the outer joint member 122 and the inner joint member 123. A spline 136 is formed in an inner peripheral surface 135 of the inner joint member 123, and a spline 137 of a shaft 132 is fitted into the spline 136. With this configuration, the inner joint member 123 and the shaft 132 are coupled to each other so as to allow torque transmission therebetween.

In recent years, there has been an increasing demand for downsizing and light-weighting of the constant velocity universal joint as well as a demand for higher-power automobiles. Further, there has been a demand for a higher steering angle of front wheels to be achieved by increasing the operating angle of the fixed type constant velocity universal joint so as not to increase the turning radius of vehicles. What is most difficult in downsizing and light-weighting of the fixed type constant velocity universal joint 121 is to secure the strength of the fixed type constant velocity universal joint 121 at high operating angles (high-angle strength). To evaluate the high-angle strength, a quasi-static torsional test is often conducted. The quasi-static torsional test refers to a test of measuring breaking torque by applying torque while rotating the constant velocity universal joint at low velocity in consideration of actual vehicle conditions. According to the quasi-static torsional test thus conducted, the strength of the constant velocity universal joint 121 depends on the strength of a carburized component, such as the cage 125 and the inner joint member 123. In particular, the strength of the constant velocity universal joint 121 greatly depends on the strength of the cage 125. Thus, in order to achieve the downsizing and light-weighting of the fixed type constant velocity universal joint 121, there is a challenge to increase the strength of the carburized component, in particular, the strength of the cage 125.

In the following patent documents, there have been proposed various measures to increase the strength of the carburized component of the constant velocity universal joint.

PRIOR ART DOCUMENTS

Patent Document 1: JP 2007-56296 A
Patent Document 2: JP 3995904 B2
Patent Document 3: JP 2001-153148 A
Patent Document 4: JP 4708430 B2
Patent Document 5: JP 4731945 B2
Patent Document 6: JP 05-331616 A

SUMMARY OF THE INVENTION

Problems to be Solved by the Invention

Details of the above-mentioned patent documents are described below. In the technology described in Patent document 1, an inlet corner portion of the spherical inner surface of the outer joint member, which may strongly interfere with the cage, is softened by local annealing, and hence the aggressiveness of the inlet corner portion against the cage is mitigated, resulting in higher strength of the cage. However, the outer joint member is subjected to additional heat treatment, thereby leading to problems in that the manufacturing cost is increased and the productivity is reduced.

In the technologies described in Patent documents 2 and 3, the strength is increased through use of special materials, but those special materials have problems in cost and global procurement of materials. Further, phosphorus (P) and fine carbides are inevitably deposited at a grain boundary due to carburizing, and hence the embrittlement of the grain boundary cannot completely be prevented, which may lead to failure of increase in strength.

The technology described in Patent document 4 relates to a cage obtained in such a manner that boron (B)-doped steel having a carbon content of from 0.3 to 0.5 mass % is quenched up to its core. This cage is not subjected to the carburizing, and hence there is a problem in that the hardness of a surface layer of the cage is lower than that of a cage subjected to the carburizing. Further, the softening resistance becomes lower, and hence there is a problem in that the abrasion resistance is degraded. In addition, B as a rare earth element is contained, and hence there is a problem in that the material cost is increased. B has high affinity for nitrogen (N), and is therefore liable to generate a nitride. When the nitride is generated, B does not contribute to the hardenability. Therefore, it is necessary to dope titanium (Ti), which has higher affinity for N than B, so as to fix N as a nitride (TiN), thereby causing B to effectively contribute to the hardenability. Due to the Ti doping, however, aluminum nitride (AlN), which contributes to obtaining fine crystal grains, is not generated, and hence, at the time of carburizing, the crystal grains may become coarse, resulting in lower strength.

In the technology described in Patent document 5, medium carbon steel is subjected to through-hardening so that the surface and the core each have a hardness of 58 HRC or more. Further, shaving of the pockets of the cage prior to the heat treatment is omitted. Similarly to Patent Literature 4, however, the cage is not subjected to the carburizing, and hence the carbon concentration in the surface layer is low. As a result, the softening resistance is low, and hence there is a problem in the abrasion resistance.

In the technology described in Patent document 6, special alloy steel is used for the cage and subjected to high-concentration carburizing, to thereby enhance the abrasion resistance. However, alloy steel leads to a problem in that the material cost is increased.

As described above, according to the related art, it has proved difficult to find a cage having characteristics of achieving both of lower cost and higher strength. The reasons are as follows. That is, the cage is used under such a severe environment that the cage is subjected to loads from three components including the outer joint member, the inner joint member, and the balls and brought into slidable contact therewith under high contact pressure. Further, the cage is thin and low in rigidity so that the cage is liable to be deformed. Still further, the cage has such a shape that stress concentration is liable to occur. For those reasons, it has proved difficult to find appropriate measures.

Carburizing steel is low-alloy steel doped with a large amount of chromium (Cr) or molybdenum (Mo) as an element having high affinity for carbon so as to promote carburizing, such as chromium steel (SCr415) or chromium molybdenum steel (SCM415). The element such as Cr or Mo is an expensive element, and hence the carburizing steel leads to a problem in that the material cost is increased as compared to carbon steel (C—Mn steel). When carbon steel that is not actively doped with Cr or Mo in an increased amount is used, on the other hand, there is a problem in that a slack-quenched structure is deposited. Further, the carburizing is treatment involving dispersion of carbon, and hence there is also a problem in that the treatment time becomes longer.

In view of the above-mentioned problems, the present invention has an object to provide a cage for a constant velocity universal joint, a fixed type constant velocity universal joint, and a drive shaft, which are excellent in strength characteristics and abrasion resistance, reduced in manufacturing cost without reduction in productivity, and are capable of achieving global procurement of a material.

Solutions to the Problems

The present invention is based on the following findings resulting from extensive studies conducted to achieve the above-mentioned object.

(1) When carbon steel without Cr or Mo, which serves to improve hardenability and promote carburizing, is subjected to carburizing, quenching, and tempering, there is a problem in that a slack-quenched structure (all the quenched structure does not become martensitic after the quenching, but contains structures of ferrite, bainite, pearlite, and the like in a mixed manner) is generated at a surface layer portion. As a result of extensive study to find the reason therefor, it has proved that the main factor of the generation of the slack-quenched structure is reduction in hardenability and carburizability, and the problem of the slack-quenched structure may be addressed by increasing the cooling rate and the carbon content of the raw material.

(2) However, the increase in cooling rate poses such a new problem that heat treatment deformation is increased. What is most problematic in this heat treatment deformation of the cage is fluctuation in dimensions of the pockets (window dimensions) for holding the balls. Nowadays, the technology of surface treatment for a cutting tool is improved greatly so that the life of the cutting tool for cutting steel hardened by quenching is prolonged, and that final finishing can be carried out within a short period of time. Thus, the inventors have focused on the trend that the above-mentioned increase in heat treatment deformation affecting the window dimensions may be addressed at low cost by the above-mentioned final finishing. As a result, the fluctuation in window dimensions is greatly suppressed as compared to the related-art carburized products, and hence the cumbersome step of matching the cage and the balls in accordance with ranking is eased greatly. Thus, it is verified that the final finishing absorbs any additional cost, thereby causing no increase in cost.

(3) What is more important has proved such that the generation of the slack-quenched structure is significantly affected by the carbon content of the material, and that the use of carbon steel having a low carbon content is liable to cause the generation of the slack-quenched structure at the hardened portion. The reason therefor is presumably heterogeneity of steel. Doped elements of steel are not distributed homogeneously, but microsegregation is present inevitably. As carburizing steel, steel having a carbon content of from 0.12 to 0.24 mass % is often used. When the microsegregation is present, the hardenability is locally fluctuated, and thus a portion having a carbon content of less than 0.55 mass % is locally generated after the carburizing. Thus, it has proved that the reduction in hardenability causes the generation of the slack-quenched structure.

(4) The increase in carbon content of the raw material significantly affects the pressability in processing the pockets of the cage. When the material becomes harder, the punch may be damaged earlier, and thus it has proved that the raw material needs to have a hardness of 94 HRB or less. Further, when the hardness of the raw material is extremely low, there is a problem of stripping or burring that may be caused at the time of turning, and thus it has proved that the raw material needs to have a hardness of 76 HRB or more.

(5) Both the characteristics of strength and abrasion resistance need to be secured at higher level. When the carburizing depth is set smaller and the core hardness is set appropriately, both the abrasion resistance and the strength, which are trade-off characteristics, have been secured successfully.

(6) Further, it has proved that, even when the carburizing depth is set larger, the strength comparable to that of the related-art cage can be obtained by limiting the content of carbon to be incorporated into the surface by the carburizing.

Based on the above-mentioned findings, the inventors have arrived at such an idea that the generation of the slack-quenched structure may be prevented by increasing the carbon content of the material in advance so that at least 0.55 mass % or more of carbon is soluble in the surface layer after the carburizing, quenching, and tempering. For the verification, an experiment was conducted, in which a ring-shaped thin cage having a relatively uniform thickness with a plurality of pockets (windows) formed therein was manufactured of low-cost carbon steel having a predetermined carbon content without Cr or Mo. As a result, it was confirmed that a sufficient cooling rate was obtained at the time of quenching so that the slack-quenched structure is not generated. Further, it was confirmed that the slack-quenched structure is liable to be generated in a case of a ring with no pockets formed therein. Based on the above-mentioned findings, idea, and verification, the present invention has been completed.

As a specific technical measure, according to one embodiment of the present invention, there is provided a cage for a constant velocity universal joint, which is formed into a ring shape with a substantially uniform thickness, comprising a plurality of pockets formed in a circumferential direction of the cage, for receiving torque transmitting balls, respectively, the cage being formed of carbon steel comprising 0.41 to 0.51 mass % of C, 0.10 to 0.35 mass % of Si, 0.60 to 0.90 mass % of Mn, 0.005 to 0.030 mass % of P, and 0.002 to 0.035 mass % of S, with the balance being Fe and an element inevitably remaining at the time of steelmaking and refining, the cage being subjected to carburizing, quenching, and tempering as heat treatment, each of the plurality of pockets having a side surface finished after the heat treatment. In this case, the "substantially uniform thickness" is a concept encompassing a thickness difference that does not cause the generation of the slack-quenched structure when the carburizing, quenching, and tempering are carried out on the cage for a constant velocity universal joint, which is formed of carbon steel having the above-mentioned ranges of contents of the elements. This means that the degree of the thickness difference that does not cause the generation of the slack-quenched structure has an appropriate range due to a difference in components of the material within the above-mentioned ranges of contents of the elements, and to a difference in carburizing conditions.

With the above-mentioned configuration, it is possible to achieve the cage for a constant velocity universal joint, which is excellent in strength characteristics and abrasion resistance, reduced in manufacturing cost and material cost without reduction in productivity, and is capable of achieving global procurement of the material.

Now, description is given of the above-mentioned limitations of numerical values on the constituent elements in units of mass %.

[C: 0.41 to 0.51 Mass %]

Carbon (C) is an element significantly affecting the generation of the slack-quenched structure, and also affecting the core hardenability, forgeability, and machinability. When the content is less than 0.41 mass %, the hardness of the raw material is reduced below 76 HRB, thereby causing stripping or burring after the machining. Further, the slack-quenched structure is generated, and hence sufficient core hardness cannot be obtained, thereby causing reduction in strength. For those reasons, the carbon content of 0.41 mass % or more is necessary. When the content of C becomes higher, on the other hand, the hardness of the raw material is increased. When the hardness exceeds 94 HRB, the processability such as the window formation pressability and the machinability is impaired significantly. Further, the core hardness is increased after the carburizing, quenching, and tempering, thereby causing embrittlement. For those reasons, the upper limit is set to 0.51 mass % also in consideration of the increase in hardness due to the other doped elements.

[Si: 0.1 to 0.35 Mass %]

Silicon (Si) is an element necessary for deoxidation, and hence the silicon content of 0.1 mass % or more is necessary. On the other hand, it is desired that the content of Si be increased so as to improve the softening resistance characteristics, but Si is an element that causes increase in generation of abnormal layers by the carburizing, quenching, and tempering, thereby causing the embrittlement of the grain boundary. For this reason, the upper limit is set to 0.35 mass %.

[Mn: 0.6 to 0.9 Mass %]

Manganese (Mn) is an element useful for improving the hardenability. The doping amount may be reduced so as to increase oxidation of the grain boundary at the time of carburizing, but when the content of Mn is reduced, the hardenability of the carburized portion is reduced, thereby causing reduction in abrasion resistance characteristics. From this viewpoint, when the content is less than 0.6 mass %, sufficient hardenability cannot be secured. When the content exceeds 0.9 mass %, on the other hand, the pearlite fraction is increased to cause hardening, thereby causing reduction in forgeability and machinability. For this reason, the upper limit of the content of Mn is set to 0.9 mass %.

[P: 0.005 to 0.030 Mass %]

Phosphorus (P) is an element that contributes to the improvement of the hardenability, but is also an element that causes embrittlement of the grain boundary. In particular, when the content exceeds 0.030 mass %, the embrittlement of the grain boundary is significant. When the content is less than 0.005 mass %, on the other hand, it is difficult to achieve reduction in the refining step, thereby causing increase in manufacturing cost and reduction in hardenability.

[S: 0.002 to 0.035 Mass %]

Sulfur (S) is an element that serves to improve the machinability, but is also an element that causes reduction in toughness, and hence it is preferred that the content of S be lower. In particular, when the content exceeds 0.035 mass %, the reduction in toughness is significant, thereby causing reduction in strength of the component, and also causing a forging crack in the process of manufacturing the component. When the content is less than 0.002 mass %, on the other hand, manganese sulfide (MnS), which serves to improve the machinability, is not generated, thereby causing reduction in machinability. For this reason, the lower limit is set to 0.002 mass %.

The balance is iron (Fe) and other elements inevitably remaining at the time of steelmaking and refining, such as molybdenum (Mo), chromium (Cr), copper (Cu), nickel (Ni), tin (Sn), boron (B), aluminum (Al), titanium (Ti), vanadium (V), nitrogen (N), and oxygen (O).

It is preferred that the cage have a spherical outer peripheral surface and a spherical inner peripheral surface, and that the cage have the substantially uniform thickness so that an axial offset amount between a curvature center of the spherical outer peripheral surface and a curvature center of the spherical inner peripheral surface is less than 1 mm. The reason is described below. The above-mentioned offset amount is preferably less than 0.7 mm. Further, a cage having a uniform thickness with no offset, that is, an offset amount of 0 mm is most preferred.

In a verification process to arrive at the present invention, an experiment was conducted, in which a cage for a plunging type double offset constant velocity universal joint (DOJ) was manufactured as illustrated in FIGS. 13 and 14. First, an overview of a constant velocity universal joint 31 of this type is described. The constant velocity universal joint 31 mainly comprises an outer joint member 32, an inner joint member 33, balls 34, and a cage 35. In a cylindrical inner peripheral surface 38 of the outer joint member 32, a plurality of track grooves 36 are formed equiangularly and linearly in parallel to a joint axial line X. In a spherical outer peripheral surface 39 of the inner joint member 33, track grooves 37 opposed to the track grooves 36 of the outer joint member 32 are formed equiangularly and linearly in parallel to the joint axial line X. Each of the plurality of balls 34 for transmitting torque is interposed between the track groove 36 of the outer joint member 32 and the track groove 37 of the inner joint member 33. The cage 35 for holding the balls 34 is arranged between the cylindrical inner peripheral surface 38 of the outer joint member 32 and the spherical outer peripheral surface 39 of the inner joint member 33.

As illustrated in FIG. 14, a plurality of (eight) pockets 49 are formed in the cage 35 in a circumferential direction. In the double offset constant velocity universal joint 31, in order to guide the balls 34 in a plane bisecting an angle formed between axial lines of the outer joint member 32 and the inner joint member 33 (operating angle), a curvature center I of a spherical outer peripheral surface 40 and a curvature center J of a spherical inner peripheral surface 41 of the cage 35 are offset by equal distances opposite to each other in the axial direction with respect to the joint center O. An offset amount f4 therebetween varies depending on a joint size, and is generally 3 to 6 mm approximately in a case of a joint size for automobiles. Therefore, the cage 35 has a thick shape with a non-uniform thickness.

An experiment was conducted, in which the cage 35 for the above-mentioned double offset constant velocity universal joint 31 was manufactured of carbon steel having a predetermined carbon content. As a result, in the case of this cage 35, cooling was difficult to carry out at the time of carburizing, quenching, and tempering. Thus, it proved that the slack-quenched structure is liable to be generated. Further, when the thickness difference is increased, the window formation pressability is reduced. For those reasons, it is preferred that the axial offset amount between the curvature center of the spherical outer peripheral surface and the curvature center of the spherical inner peripheral surface be less than 1 mm.

Further, it is preferred that the carbon steel for forming the cage comprise 0.42 to 0.48 mass % of C, and have a surface hardness of from 58 to 62 HRC and a core hardness of from 56 to 59 HRC after the carburizing, quenching, and tempering. It is preferred that the surface hardness after grinding be 56 HRC or more at each of the inner and outer peripheral surface portions, and 58 HRC or more at the side surface portion of the pocket. In this case, the strength is most stable, thereby being capable of achieving a cage having high strength. Higher surface hardness is appropriate after the grinding from the viewpoint of abrasion resistance, but lower surface hardness is appropriate from the viewpoint of strength. Therefore, appropriate surface hardness is set in consideration of the contact pressure to be applied to the cage. The inner peripheral surface portion and the outer peripheral surface portion are held in surface contact or line contact, and hence the contact pressure is low. On the other hand, the side surface portion of the pocket is held in point contact, and hence the contact pressure is high. Therefore, it is preferred that the hardness of the side surface portion of the pocket be higher than that of each of the inner and outer peripheral surface portions. Accordingly, it is preferred that a minimum hardness of 58 HRC, which does not cause the generation of the slack-quenched structure, be set to a lower limit of the side surface portion of the pocket. At each of the inner and outer peripheral surface portions, the contact pressure is low, and hence the generation of fine slack-quenched structures is allowable. Accordingly, it is preferred that a hardness of 56 HRC be set to a lower limit of each of the inner and outer peripheral surface portions.

It is preferred that a total case depth of the above-mentioned cage be set to 0.25 to 0.55 mm. Further, when the total case depth is 0.25 to 0.45 mm, the strength is more stable. As the case depth, an optimum depth is determined from the viewpoint of carburizing time and rolling life. Smaller case depth is desired from the viewpoint of carburizing time, but the rolling life becomes shorter when the case depth is small. Further, final finishing is carried out after the carburizing, quenching, and tempering, and hence a machining allowance of 0.2 mm at a maximum is considered for each of the inner and outer peripheral surface portions, whereas a machining allowance of 0.1 mm at a maximum is considered for the side surface portion of the pocket. In addition, from the viewpoint of rolling life, a thickness of 0.05 mm at a minimum needs to be secured for a carburized layer remaining after the final finishing. From those factors, the lower limit of the total case depth after the carburizing, quenching, and tempering was set to 0.25 mm. On the other hand, the upper limit was set to 0.55 mm in consideration of fluctuation in components of the material and fluctuation in carburizing conditions. In this case, the total case depth, which is defined in conformity with JIS G 0557, refers to a distance from the surface of the hardened layer to a position where there is no difference in physical property (hardness) between the hardened layer and the base.

It is preferred that a carbon concentration in a surface layer of the above-mentioned cage be set to 0.55 to 0.75 mass %. When the concentration in the surface resulting from the carburizing exceeds 0.75 mass %, pro-eutectoid cementite is liable to be deposited on an acute portion at a grain boundary after the carburizing, quenching, and tempering so that the strength is reduced significantly. For this reason, the upper limit was set to 0.75 mass %. When the concentration is less than 0.55 mass %, on the other hand, the hardness and the softening resistance characteristics are reduced so that the abrasion is increased significantly. For this reason, the lower limit was set to 0.55 mass %. Through such limitation of the carbon concentration in the surface, the toughness of the surface is increased. Thus, even when the case depth is increased, the strength is not reduced significantly. Therefore, the total case depth was able to be increased so that the upper limit was able to be raised to 0.75 mm.

When the above-mentioned cage is applied to a fixed type constant velocity universal joint comprising a cage having a substantially uniform thickness and being required to have the strength at high operating angles, it is possible to achieve low cost, high strength, and abrasion resistance comparable to that of the related-art cage made of carburizing steel (for example, SCr415 or SCM415), and by extension, to secure low cost, high strength, and abrasion resistance of the fixed type constant velocity universal joint and a drive shaft incorporating the fixed type constant velocity universal joint.

Effects of the Invention

According to the one embodiment of the present invention, it is possible to achieve the cage for a constant velocity universal joint, which is excellent in strength characteristics and abrasion resistance, reduced in manufacturing cost and material cost without reduction in productivity, and is capable of achieving global procurement of the material.

More specifically, low-cost carbon steel that is not actively doped with expensive chromium (Cr), molybdenum (Mo), or boron (B) in an increased amount is used, and the carburizing time can be shortened greatly. As a result, it is possible to achieve the cage having high strength, which is capable of achieving reduction in heat treatment cost and improvement in productivity, and is increased in core hardness.

EMBODIMENTS OF THE INVENTION

Now, embodiments of the present invention are described with reference to the drawings.

Figure 1:
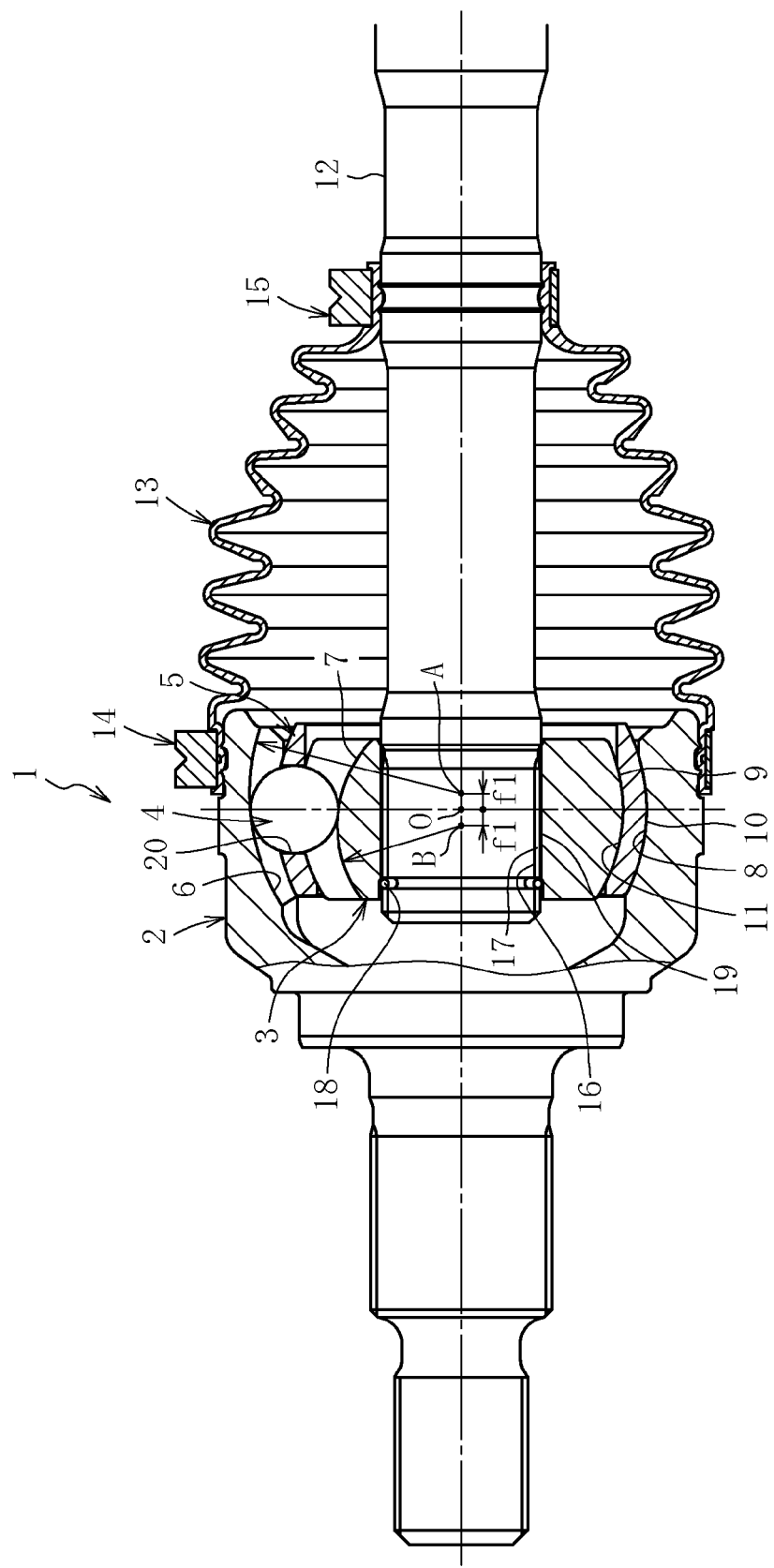
FIG. 1 is a longitudinal sectional view of a fixed type constant velocity universal joint incorporating a cage for a constant velocity universal joint according to a first embodiment of the present invention.

A cage for a constant velocity universal joint according to a first embodiment of the present invention is described with reference to FIGS. 1 to 5. FIG. 1 is a longitudinal sectional view of a fixed type constant velocity universal joint incorporating the cage of this embodiment. As compared to a related-art six-ball constant velocity universal joint, a constant velocity universal joint 1 of this embodiment, which is an eight-ball type Rzeppa constant velocity universal joint, has a smaller track offset amount, a larger number of balls, and has a smaller diameter. Thus, it is possible to achieve a highly efficient constant velocity universal joint that is lightweight and compact, and is suppressed in torque loss. The constant velocity universal joint 1 mainly comprises an outer joint member 2, an inner joint member 3, balls 4, and a cage 5.

In a spherical inner peripheral surface 8 of the outer joint member 2, eight track grooves 6 are formed equiangularly so as to extend along an axial direction. In a spherical outer peripheral surface 9 of the inner joint member 3, track grooves 7 opposed to the track grooves 6 of the outer joint member 2 are formed equiangularly so as to extend along the axial direction. Each of the eight balls 4 for transmitting torque is incorporated between the track groove 6 of the outer joint member 2 and the track groove 7 of the inner joint member 3. The cage 5 for holding the balls 4 is arranged between the spherical inner peripheral surface 8 of the outer joint member 2 and the spherical outer peripheral surface 9 of the inner joint member 3. A spline 17 is formed in an inner peripheral surface 16 of the inner joint member 3, and a spline 19 of a shaft 12 is fitted into the spline 17 and fixed in the axial direction with a retaining ring 18. An outer periphery of the outer joint member 2 and an outer periphery of the shaft 12 coupled to the inner joint member 3 are covered with a boot 13, and the boot 13 is fixed by fastening with boot bands 14 and 15. Grease is sealed inside the joint as a lubricant.

The cage 5 has a spherical outer peripheral surface 10 fitted to the spherical inner peripheral surface 8 of the outer joint member 2, and a spherical inner peripheral surface 11 fitted to the spherical outer peripheral surface 9 of the inner joint member 3. The spherical outer peripheral surface 10 and the spherical inner peripheral surface 11 each have a curvature center formed at a joint center O. On the other hand, a curvature center A of the track groove 6 of the outer joint member 2 and a curvature center B of the track groove 7 of the inner joint member 3 are offset in the axial direction by equal distances with respect to the joint center O. Thus, when the joint forms an operating angle, the balls 4 are always guided in a plane bisecting an angle formed between axial lines of the outer joint member 2 and the inner joint member 3 (operating angle). As a result, rotational torque is transmitted at a constant velocity between the two axes.

Due to the configuration that the curvature center A of the track groove 6 of the outer joint member 2 and the curvature center B of the track groove 7 of the inner joint member 3 are offset in the axial direction by equal distances with respect to the joint center O, the opposing track grooves 6 and 7 of the outer joint member 2 and the inner joint member 3 form a wedge shape expanding from an interior side toward an opening side of the outer joint member 2. Each ball 4 is received in the track grooves 6 and 7 of the wedge shape, to thereby transmit torque between the outer joint member 2 and the inner joint member 3. The cage 5 is incorporated so as to hold all the balls 4 in the plane bisecting the operating angle. The track grooves 6 and 7 are formed into an elliptical shape or a Gothic arch shape in lateral cross section, and the track grooves 6 and 7 are held in so-called angular contact with each ball 4 at a contact angle (approximately from 30° to 45°). Thus, the ball 4 is held in contact with the track grooves 6 and 7 on their side surface sides, which are slightly spaced apart from groove bottoms of the track grooves 6 and 7.

Figure 2:
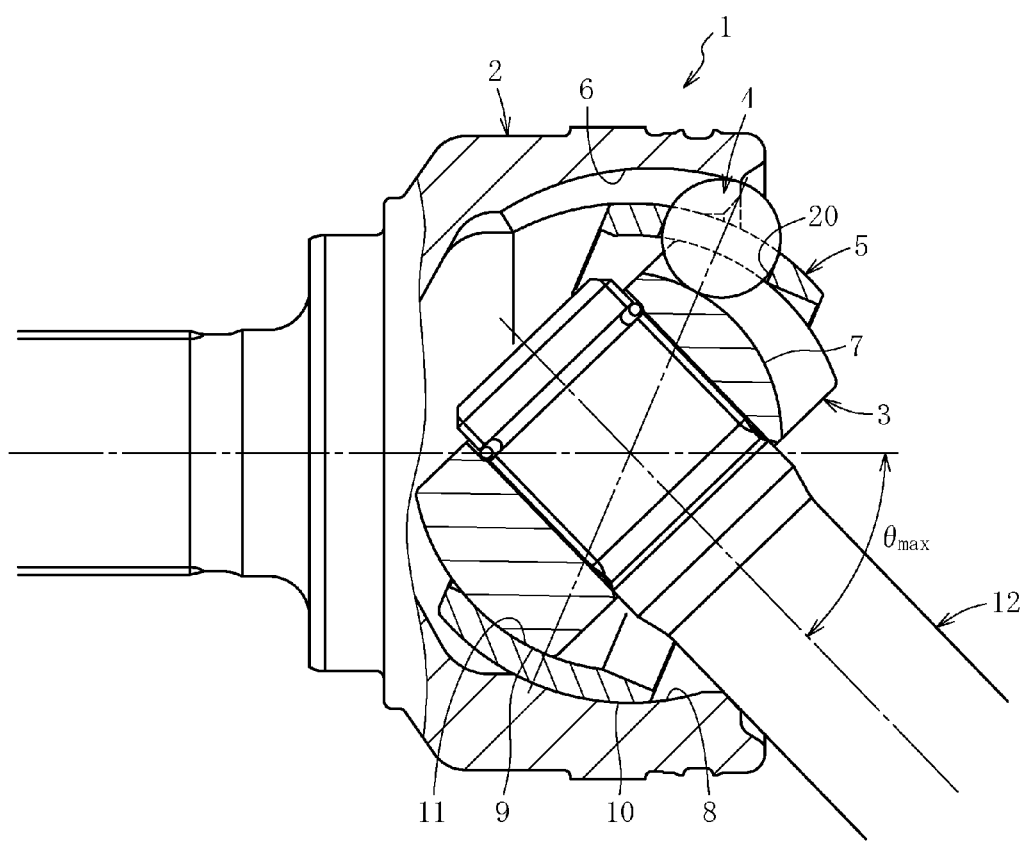
FIG. 2 is a longitudinal sectional view illustrating a state in which the fixed type constant velocity universal joint of FIG. 1 forms a maximum operating angle.

FIG. 2 is a longitudinal sectional view illustrating a state in which the constant velocity universal joint 1 forms a maximum operating angle $\theta_{max}$. The maximum operating angle $\theta_{max}$ of the constant velocity universal joint 1 is approximately 47°. When the torque is transmitted under the state in which the constant velocity universal joint 1 forms an operating angle, a push-out force is applied to the ball 4, with the result that a pocket load caused by the ball 4 is applied to a side surface 23 (see FIG. 3) of a pocket 20 of the cage 5 in a direction of expansion of the space between the track grooves 6 and 7 of the wedge shape. Further, due to the pocket load, the cage 5 is pressed against the spherical inner peripheral surface 8 of the outer joint member 2 and the spherical outer peripheral surface 9 of the inner joint member 3. The wedge angle formed between the track grooves 6 and 7 of the wedge shape becomes higher as the operating angle becomes higher. Therefore, the push-out force applied to the ball 4 becomes greater as the torque and the operating angle become higher. Thus, in order to form a high operating angle while transmitting the torque, the cage 5 needs to have sufficient strength. Further, the spherical outer peripheral surface 10 and the spherical inner peripheral surface 11 of the cage 5 are slid in contact with the spherical inner peripheral surface 8 of the outer joint member 2 and the spherical outer peripheral surface 9 of the inner joint member 3, and hence the cage 5 needs to have sufficient abrasion resistance.

Further, in order to reliably hold the ball 4 in the bisecting plane and prevent abnormal noise, the ball 4 is often incorporated into the pocket 20 of the cage 5 with a negative clearance. That is, the diameter of the ball 4 is slightly larger than a window dimension K (see FIG. 3) between the side surfaces 23 and 23 of the pocket 20 of the cage 5, which face each other in the axial direction. Further, when the joint forms an operating angle, the ball 4 is moved inside the pocket 20 of the cage 5 in a radial direction and a circumferential direction. The ball 4 is moved in the radial direction and the circumferential direction under the state in which the ball 4 is incorporated into the pocket 20 with the negative clearance as described above, and hence sufficient strength and abrasion resistance are necessary.

Figure 3:
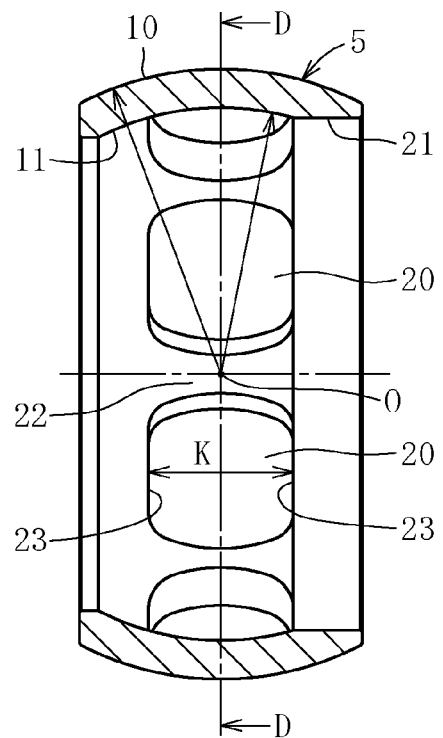
FIG. 3 is a longitudinal sectional view of the cage of FIG. 1.
Figure 4:
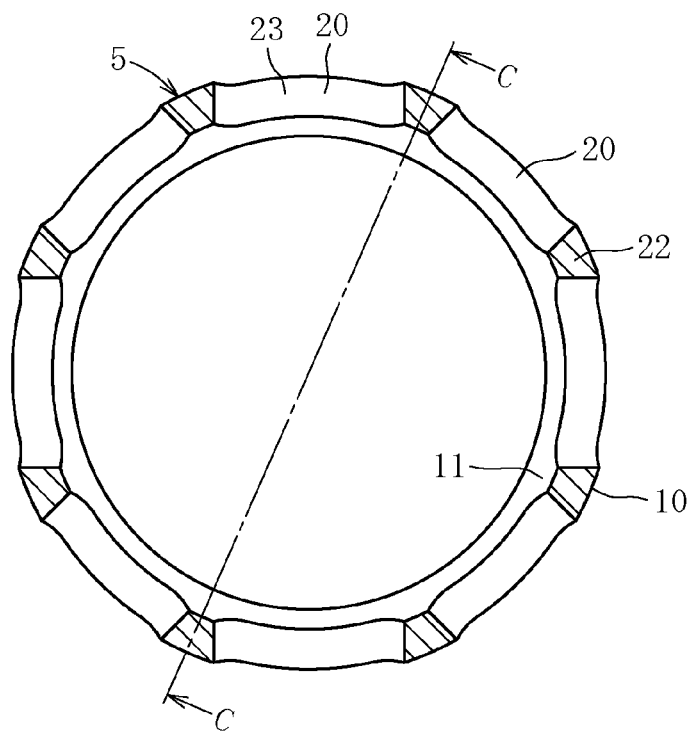
FIG. 4 is a lateral sectional view of the cage of FIG. 1.

FIGS. 3 and 4 illustrate the cage of this embodiment. FIG. 3 is a longitudinal sectional view taken along the line C-C of FIG. 4, and FIG. 4 is a lateral sectional view taken along the line D-D of FIG. 3. As illustrated in FIG. 3, the cage 5 is formed into a ring shape having the spherical outer peripheral surface 10 and the spherical inner peripheral surface 11. The curvature center of the spherical outer peripheral surface 10 and the curvature center of the spherical inner peripheral surface 11 are positioned at the joint center O with no axial offset (offset amount: 0 mm). The cage 5 is formed so as to have a small and uniform thickness. A mating portion 21 for incorporating the inner joint member 3 is formed at an end portion of the spherical inner peripheral surface 11 of the cage 5, which is positioned on the opening side of the outer joint member 2. This portion is thinned.

It is preferred that the cage 5 have a substantially uniform thickness so that the axial offset amount between the curvature center of the spherical outer peripheral surface 10 and the curvature center of the spherical inner peripheral surface 11 is less than 1 mm. In a case of a cage having a large and non-uniform thickness, cooling is difficult to carry out at the time of carburizing and quenching. Thus, it has proved that a slack-quenched structure is liable to be generated. Further, when a thickness difference is increased, the window formation pressability is reduced. For those reasons, the axial offset amount between the curvature center of the spherical outer peripheral surface and the curvature center of the spherical inner peripheral surface is set to less than 1 mm, preferably less than 0.7 mm.

As illustrated in FIGS. 3 and 4, the plurality of (eight) pockets 20 for receiving the balls 4 are formed in the cage 5 in the circumferential direction, and a columnar portion 22 is formed between the pockets 20 and 20. As described above, when the joint transmits the torque, the push-out force is applied to the ball 4, with the result that the pocket load caused by the ball 4 is applied to the side surfaces 23 of the pocket 20 of the cage 5, which face each other in the axial direction. Further, due to the pocket load, the spherical outer peripheral surface 10 and the spherical inner peripheral surface 11 of the cage 5 are pressed against the spherical inner peripheral surface 8 of the outer joint member 2 and the spherical outer peripheral surface 9 of the inner joint member 3, respectively.

The material for the cage 4 is carbon steel, which contains, as components thereof, 0.41 to 0.51 mass % of C, 0.10 to 0.35 mass % of Si, 0.60 to 0.90 mass % of Mn, 0.005 to 0.030 mass % of P, and 0.002 to 0.035 mass % of S, with the balance being iron (Fe) and an element inevitably remaining at the time of steelmaking and refining. The cage 5 is subjected to carburizing, quenching, and tempering as heat treatment. After the heat treatment, the spherical outer peripheral surface 10 and the spherical inner peripheral surface 11 of the cage 5 are finished by grinding or cutting, and the side surface 23 of the pocket 20 is also finished by cutting. The cage 5 provides an advantage achieved by using low-cost carbon steel that is not actively doped with expensive chromium (Cr), molybdenum (Mo), or boron (B) in an increased amount. In addition, the carbon content of carbon steel is higher than that of carburizing steel, thereby being capable of greatly shortening the carburizing time. As a result, it is possible to achieve a cage having high strength, which is capable of achieving reduction in heat treatment cost and improvement in productivity, and is increased in core hardness. Further, the material is not a special material, thereby being capable of achieving global procurement of the material. Still further, the heat treatment involves the carburizing, quenching, and tempering, and hence the abrasion resistance is excellent as well as the strength characteristics.

Further, it is preferred that carbon steel for forming the cage 5 contain 0.42 to 0.48 mass % of C. With this setting, a surface hardness of 58 HRC or more and a core hardness of from 56 to 59 HRC are obtained. In this case, the strength is most stable, thereby being capable of achieving a cage having high strength.

It is preferred that a total case depth of the cage 5 be set to 0.25 to 0.55 mm. Higher surface hardness is appropriate after the carburizing, quenching, and tempering from the viewpoint of abrasion resistance, but lower surface hardness is appropriate from the viewpoint of strength. Therefore, it is preferred that a minimum hardness of 58 HRC, which does not cause generation of the slack-quenched structure, be set to a lower limit. As the case depth, an optimum depth is determined from the viewpoint of carburizing time and rolling life. Smaller case depth is desired from the viewpoint of carburizing time, but the rolling life becomes shorter when the case depth is small. Further, the spherical outer peripheral surface 10 and the spherical inner peripheral surface 11 of the cage 5 and the side surface 23 of the pocket 20 are finished after the carburizing, quenching, and tempering, and hence a machining allowance of 0.2 mm at a maximum is considered for the spherical outer peripheral surface 10 and the spherical inner peripheral surface 11, whereas a machining allowance of 0.1 mm at a maximum is considered for the side surface 23 of the pocket 20. In addition, from the viewpoint of rolling life, a thickness of 0.05 mm at a minimum needs to be secured for a carburized layer remaining after the final finishing. From those factors, it is preferred that the lower limit of the total case depth after the carburizing, quenching, and tempering be 0.25 mm. On the other hand, it is preferred that the upper limit be 0.55 mm in consideration of fluctuation in components of the material and fluctuation in carburizing conditions.

Further, it is preferred that a carbon concentration in a surface layer of the cage 5 be set to 0.55 to 0.75 mass %. When the concentration in the surface resulting from the carburizing exceeds 0.75 mass %, pro-eutectoid cementite is liable to be deposited on an acute portion at a grain boundary after the carburizing, quenching, and tempering so that the strength is reduced significantly. For this reason, it is preferred that the upper limit be 0.75 mass %. When the concentration is less than 0.55 mass %, on the other hand, the hardness and the softening resistance characteristics are reduced so that the abrasion is increased significantly. For this reason, it is preferred that the lower limit be 0.55 mass %. Through the limitation of the carbon concentration, the total case depth after the carburizing, quenching, and tempering can further be increased, with the result that the strength is not reduced in a range of up to 0.75 mm.

Figure 5:
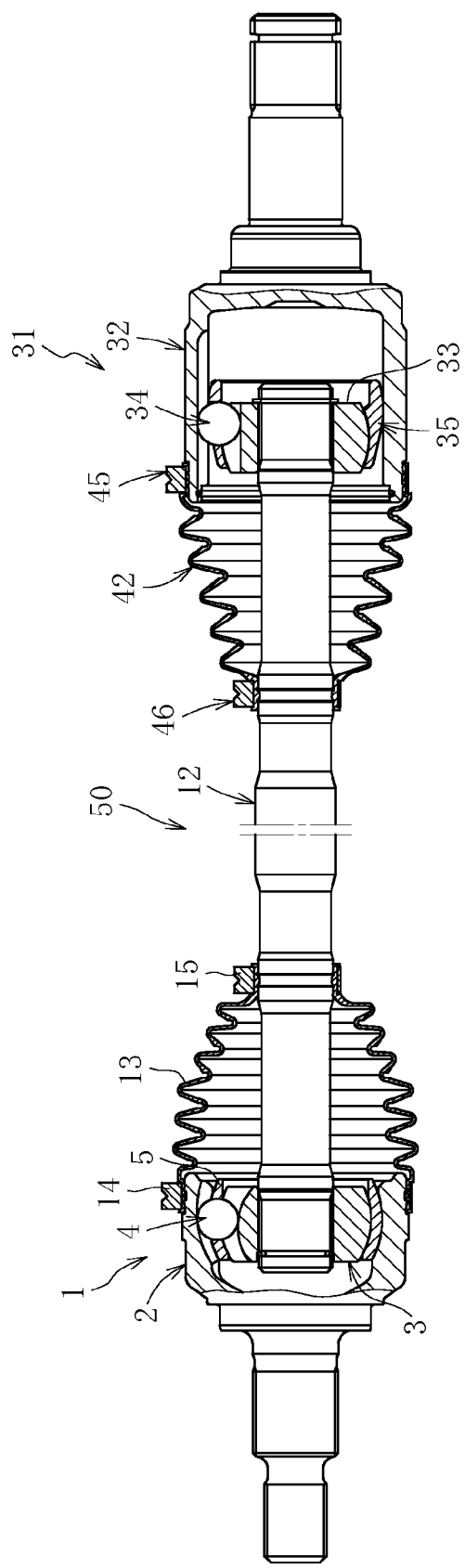
FIG. 5 is a longitudinal sectional view of an automotive drive shaft to which the fixed type constant velocity universal joint of FIG. 1 is applied.

FIG. 5 illustrates an automotive front drive shaft 50, to which the fixed type Rzeppa constant velocity universal joint 1 incorporating the cage 5 for a constant velocity universal joint according to the first embodiment is applied. The Rzeppa constant velocity universal joint 1 mainly comprises the outer joint member 2, the inner joint member 3, the balls 4, and the cage 5 according to the first embodiment. The inner joint member 3 is spline-coupled to one end of the shaft 12. An inner joint member 33 of a plunging type double offset constant velocity universal joint 31 is spline-coupled to another end of the shaft 12. The double offset constant velocity universal joint 31 mainly comprises an outer joint member 32, the inner joint member 33, balls 34, and a cage 35. At positions between an outer peripheral surface of the Rzeppa constant velocity universal joint 1 and an outer peripheral surface of the shaft 12 and between an outer peripheral surface of the double offset constant velocity universal joint 31 and the outer peripheral surface of the shaft 12, bellows boots 13 and 42 are fixed by fastening with boot bands 14, 15, 45, and 46, respectively. Grease is sealed inside the joint as a lubricant.

When the cage 5 of the first embodiment is applied to the fixed type constant velocity universal joint that is required to have the strength at high operating angles, it is possible to achieve low cost, high strength, and abrasion resistance comparable to that of the related-art cage made of carburizing steel (for example, SCr415 or SCM415), and by extension, to secure low cost, high strength, and abrasion resistance of the fixed type constant velocity universal joint and the drive shaft.

Figure 6:
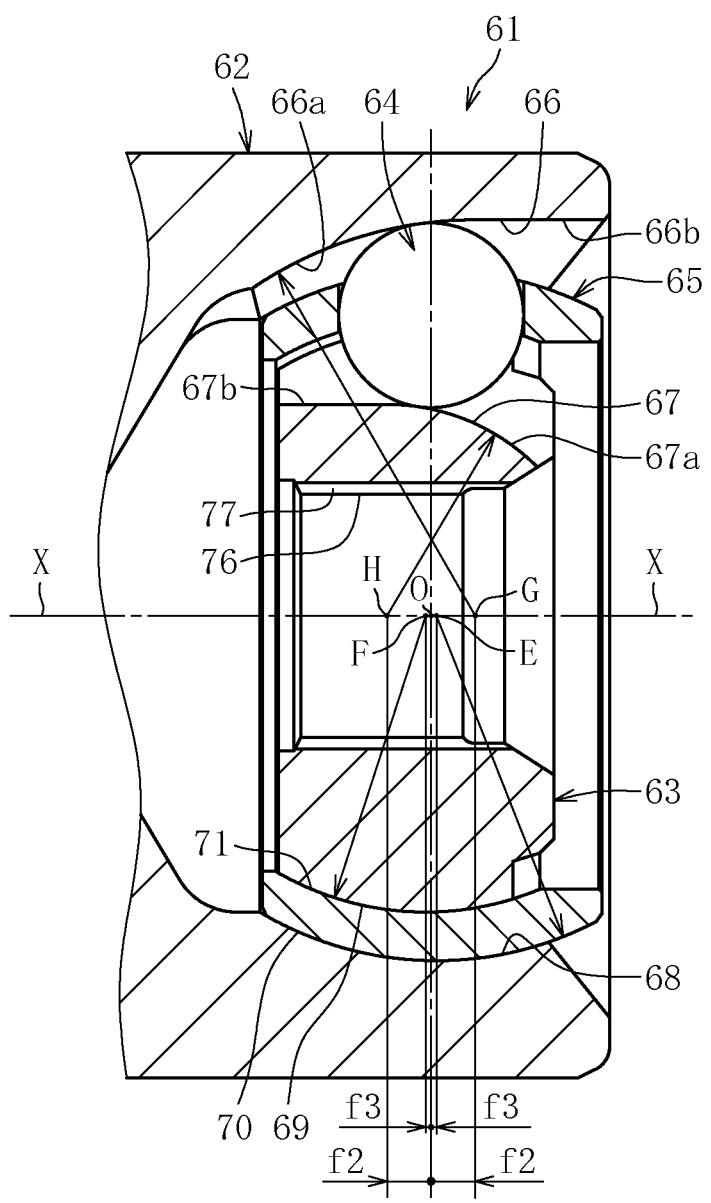
FIG. 6 is a longitudinal sectional view of a fixed type constant velocity universal joint incorporating a cage for a constant velocity universal joint according to a second embodiment of the present invention.
Figure 7:
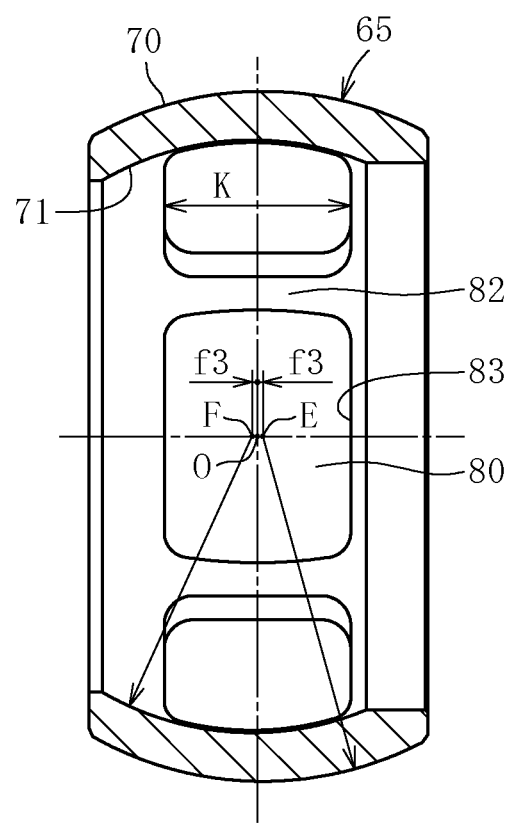
FIG. 7 is a longitudinal sectional view of the cage of FIG. 6.

Next, a cage for a constant velocity universal joint according to a second embodiment of the present invention is described with reference to FIGS. 6 and 7. FIG. 6 is a longitudinal sectional view of a fixed type constant velocity universal joint incorporating the cage of this embodiment, and FIG. 7 is a longitudinal sectional view of the above-mentioned cage. A constant velocity universal joint 61 of this embodiment is a six-ball type undercut-free constant velocity universal joint. The constant velocity universal joint 61 mainly comprises an outer joint member 62, an inner joint member 63, balls 64, and a cage 65.

In a spherical inner peripheral surface 68 of the outer joint member 62, six track grooves 66 are formed equiangularly so as to extend along the axial direction. In a spherical outer peripheral surface 69 of the inner joint member 63, six track grooves 67 opposed to the track grooves 66 of the outer joint member 62 are formed equiangularly so as to extend along the axial direction. Each of the six balls 64 for transmitting torque is incorporated between the track groove 66 of the outer joint member 62 and the track groove 67 of the inner joint member 63. The cage 65 for holding the balls 64 is arranged between the spherical inner peripheral surface 68 of the outer joint member 62 and the spherical outer peripheral surface 69 of the inner joint member 63. A spline 77 is formed in an inner peripheral surface 76 of the inner joint member 63, and although illustration is omitted, a spline of a shaft is fitted into the spline 77 and fixed in the axial direction with a retaining ring. An outer periphery of the outer joint member 62 and an outer periphery of the shaft coupled to the inner joint member 63 are covered with a boot, and grease is sealed inside the joint as a lubricant.

The cage 65 of this embodiment has a spherical outer peripheral surface 70 fitted to the spherical inner peripheral surface 68 of the outer joint member 62, and a spherical inner peripheral surface 71 fitted to the spherical outer peripheral surface 69 of the inner joint member 63. A curvature center E of the spherical outer peripheral surface 70 and a curvature center F of the spherical inner peripheral surface 71 are slightly offset in the axial direction by equal distances with respect to the joint center O. An offset amount f3 therebetween is 1 mm or less. The track groove 66 of the outer joint member 62 comprises an arc-shaped track groove portion 66a formed on the interior side, and a linear track groove portion 66b formed on the opening side. The arc-shaped track groove portion 66a has a curvature center G, and the linear track groove portion 66b is formed in parallel to a joint axial line X. The track groove 67 of the inner joint member 63 comprises an arc-shaped track groove portion 67a formed on the opening side, and a linear track groove portion 67b formed on the interior side. The arc-shaped track groove portion 67a has a curvature center H, and the linear track groove portion 67b is formed in parallel to the joint axial line X. The curvature center G of the arc-shaped track groove portion 66a of the outer joint member 62 and the curvature center H of the arc-shaped track groove portion 67a of the inner joint member 63 are offset in the axial direction by equal distances with respect to the joint center O. When the joint forms an operating angle, the balls 64 are always guided in a plane bisecting an angle formed between axial lines of the outer joint member 62 and the inner joint member 63 (operating angle). As a result, rotational torque is transmitted at a constant velocity between the two axes.

Also in the constant velocity universal joint 61, the opposing track grooves 66 and 67 of the outer joint member 62 and the inner joint member 63 form a wedge shape expanding from the interior side toward the opening side of the outer joint member 62. Therefore, similarly to the cage 5 of the above-mentioned first embodiment, a pocket load is applied to the cage 65, and along with this, spherical contact forces are applied between the spherical outer peripheral surfaces 69 and 70 and the spherical inner peripheral surfaces 71 and 68, respectively. Further, in the constant velocity universal joint 61, the track grooves 66 and 67 of the outer joint member 62 and the inner joint member 63 comprise the linear track groove portions 66b and 67b, respectively. Thus, it is possible to form an operating angle of, for example, approximately 50° higher than that of the constant velocity universal joint 1 described above in the first embodiment. Further, with the linear track groove portion 66b and 67b, the wedge angle becomes even higher. Therefore, the cage 65 needs to have sufficient strength and abrasion resistance.

FIG. 7 illustrates the cage of this embodiment. FIG. 7 is a longitudinal sectional view taken at a center of a columnar portion of the cage. The cage 65 is formed into a ring shape having the spherical outer peripheral surface 70 and the spherical inner peripheral surface 71. Six pockets 80 for receiving the balls 64 are formed in the circumferential direction, and a columnar portion 82 is formed between the pockets 80 and 80. The curvature center E of the spherical outer peripheral surface 70 and the curvature center F of the spherical inner peripheral surface 71 of the cage 65 are slightly offset in the axial direction by equal distances with respect to the joint center O. The offset amount f3 therebetween is 1 mm or less, and the cage 65 has a substantially uniform thickness.

As in the first embodiment, the material for the cage 65 of this embodiment is carbon steel, which contains, as components thereof, 0.41 to 0.51 mass % of C, 0.10 to 0.35 mass % of Si, 0.60 to 0.90 mass % of Mn, 0.005 to 0.030 mass % of P, and 0.002 to 0.035 mass % of S, with the balance being Fe and an element inevitably remaining at the time of steelmaking and refining. The cage 65 is subjected to carburizing, quenching, and tempering as heat treatment. A side surface 83 of the pocket 80 is finished after the heat treatment.

Also in the cage 65 of this embodiment, similarly to the cage 5 of the above-mentioned first embodiment, it is preferred that carbon steel for forming the cage contain 0.42 to 0.48 mass % of C, and have a surface hardness of 58 HRC or more and a core hardness of from 56 to 59 HRC, that a total case depth of the cage be set to 0.25 to 0.55 mm, and that a carbon concentration in a surface layer of the cage be set to 0.55 to 0.75 mass %. Therefore, redundant description thereof is omitted herein.

Figure 8:
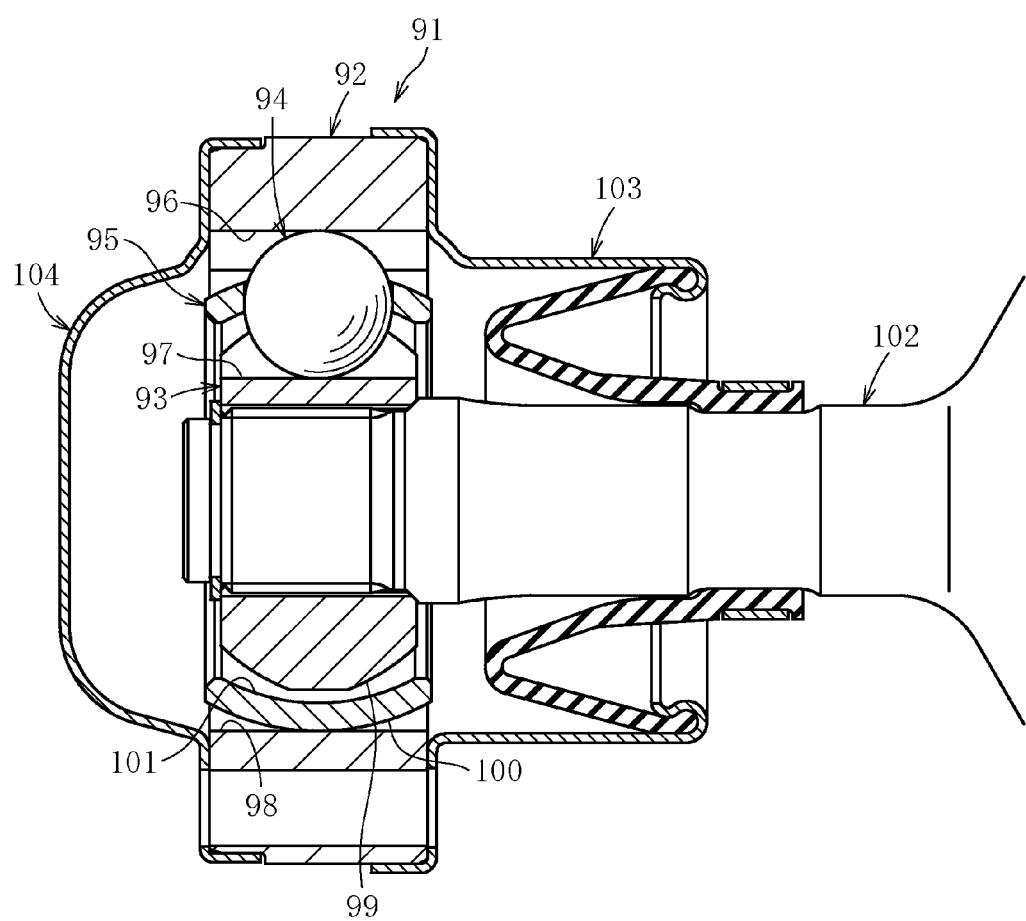
FIG. 8 is a longitudinal sectional view of a plunging type constant velocity universal joint incorporating a cage for a constant velocity universal joint according to a third embodiment of the present invention.

A cage for a constant velocity universal joint according to a third embodiment of the present invention is described with reference to FIGS. 8 to 10. The constant velocity universal joint incorporating the cage of this embodiment is a plunging type cross groove constant velocity universal joint. A constant velocity universal joint 91 of this embodiment mainly comprises an outer joint member 92, an inner joint member 93, balls 94, and a cage 95. Six track grooves 96 are formed in a cylindrical inner peripheral surface 98 of the outer joint member 92. Six track grooves 97 opposed to the track grooves 96 of the outer joint member 92 are formed in a projecting outer peripheral surface 99 of the inner joint member 93. The cage 95 for holding the balls 94 is arranged between the cylindrical inner peripheral surface 98 of the outer joint member 92 and the projecting outer peripheral surface 99 of the inner joint member 93. The paired track grooves 96 and 97 of the outer joint member 92 and the inner joint member 93 are inclined opposite to each other in the circumferential direction, and each of the balls is incorporated at a crossing portion of both the track grooves 96 and 97 (see FIG. 9). With this structure, a backlash between the ball 94 and each of the track grooves 96 and 97 can be suppressed, and hence this constant velocity universal joint is widely used particularly for an automotive drive shaft and an automotive propeller shaft, which are averse to the backlash.

Figure 9:
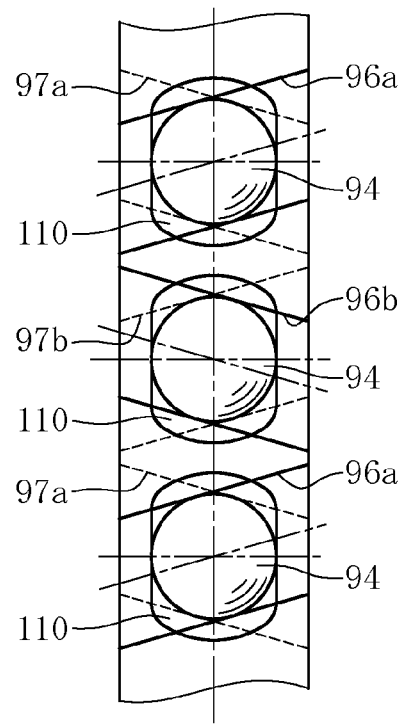
FIG. 9 is a schematic view illustrating a state of track grooves and the cage of the plunging type constant velocity universal joint of FIG. 8.

As illustrated in FIG. 9, ball grooves 96a and 96b are formed on an inner periphery of the outer joint member 92, and the adjacent ball grooves 96a and 96b are inclined opposite to each other in the circumferential direction. Ball grooves 97a and 97b are formed on an outer periphery of the inner joint member 93, and the adjacent ball grooves 97a and 97b are also inclined opposite to each other in the circumferential direction. The paired track grooves 96a and 97a or the paired track grooves 96b and 97b of the outer joint member 92 and the inner joint member 93 are also inclined opposite to each other, and each of the balls 94 is incorporated between the paired track grooves. With this structure, when the joint forms an operating angle, the balls 94 are always guided in a plane bisecting an angle formed between axial lines of the outer joint member 92 and the inner joint member 93 (operating angle). As a result, rotational torque is transmitted at a constant velocity between the two axes.

A spline is formed in an inner peripheral surface of the inner joint member 93, and a spline of a shaft 102 is fitted into the spline and fixed in the axial direction with a retaining ring. To prevent leakage of lubricating grease and entry of foreign matter, a boot 103 is fixed to the outer joint member 92 and the shaft 102, and an end plate 104 is fixed to an opposite end surface of the outer joint member 92.

Figure 10:
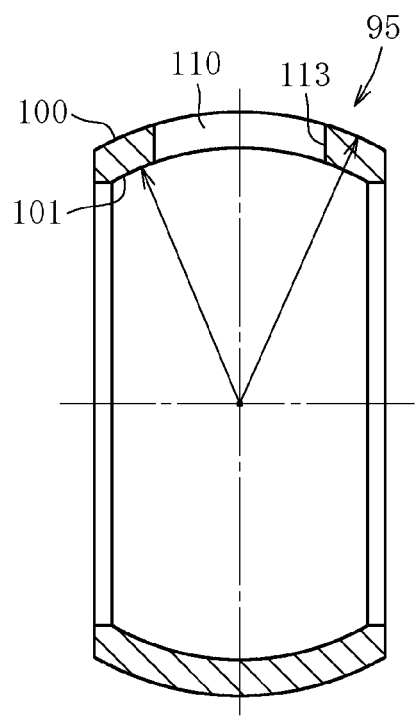
FIG. 10 is a longitudinal sectional view of the cage of FIG. 8.

As illustrated in FIGS. 9 and 10, the cage 95 has a plurality of pockets 110 arranged at predetermined intervals in the circumferential direction. A curvature center of a spherical outer peripheral surface 100 and a curvature center of a spherical inner peripheral surface 101 of the cage 95 coincide with a center of the width of the cage 95 with no axial offset.

As in the first embodiment, the material for the cage 95 of this embodiment is also carbon steel, which contains, as components thereof, 0.41 to 0.51 mass % of C, 0.10 to 0.35 mass % of Si, 0.60 to 0.90 mass % of Mn, 0.005 to 0.030 mass % of P, and 0.002 to 0.035 mass % of S, with the balance being Fe and an element inevitably remaining at the time of steelmaking and refining. The cage 95 is subjected to carburizing, quenching, and tempering as heat treatment. A side surface 113 of the pocket 110 is finished after the heat treatment.

Also in the cage 95 of this embodiment, similarly to the cage 5 of the above-mentioned first embodiment, it is preferred that carbon steel for forming the cage contain 0.42 to 0.48 mass % of C, and have a surface hardness of 58 HRC or more and a core hardness of from 56 to 59 HRC, that a total case depth of the cage be set to 0.25 to 0.55 mm, and that a carbon concentration in a surface layer of the cage be set to 0.55 to 0.75 mass %. Therefore, redundant description thereof is omitted herein.

EXAMPLES

Examples of the present invention and Comparative Example are described below. First, an overview of a processing method for a cage is described. Several types of processing method for a cage are given as described below.
(1) Steel pipe→Cutting→Upsetting→Turning→Window (pocket) formation pressing→Window finishing→Carburizing, quenching, and tempering→Final finishing
(2) Steel pipe→Cutting→Turning→Rolling→Turning-→Window formation pressing→Window finishing→Carburizing, quenching, and tempering→Final finishing
(3) Steel bar→Cutting→Hot forging→Turning→Window formation pressing→Window finishing→Carburizing, quenching, and tempering→Final finishing The respective steps of the above-mentioned processing methods are typical examples, and any appropriate modification and addition may be made as necessary. For example, heat treatment may be added so as to soften a workpiece that is work-hardened after the upsetting or rolling, or the window finishing before the heat treatment may be omitted. The present invention is not limited to the processing method.

In Examples and Comparative Example, the processing was carried out based on the steps of the above-mentioned method (1). Components of a material for a steel pipe made of carbon steel, which was used in Example 1, are described below.

[Components of Material for Steel Pipe Used in Example 1]

The material contains 0.45 mass % of C, 0.24 mass % of Si, 0.76 mass % of Mn, 0.014 mass % of P, 0.012 mass % of S, 0.02 mass % of Cu, 0.16 mass % of Cr, 0.03 mass % of Ni, 0.01 mass % of Mo, 0.001 mass % of Ti, and 0.0001 mass % of B, with the balance being Fe and an element inevitably remaining at the time of steelmaking and refining. The hardness of the steel pipe was 185 HV after annealing.

Components of a material for a steel pipe made of low-alloy steel (SCr415 as specified in JIS G 4052), which was used in Comparative Example, are described below.

[Components of Material for Steel Pipe Used in Comparative Example]

The material contains 0.15 mass % of C, 0.29 mass % of Si, 0.73 mass % of Mn, 0.015 mass % of P, 0.018 mass % of S, 0.02 mass % of Cu, 1.00 mass % of Cr, 0.02 mass % of Ni, 0.01 mass % of Mo, 0.001 mass % of Ti, and 0.0001 mass % of B, with the balance being Fe and an element inevitably remaining at the time of steelmaking and refining. The hardness of the steel pipe was 150 HV after annealing.

As the cages of Examples and Comparative Example, cages of an eight-ball fixed type constant velocity universal joint (allowable maximum operating angle: 47°) adaptable to a nominal size of 25.4 of a constant velocity universal joint in Table 3 of page 3 of the Japanese Automobile Standards (JASO C 304-89: "Constant velocity universal joints for halfshaft of automobiles," established on Mar. 31, 1989, published by the Society of Automotive Engineers of Japan) were used for processing. A curvature center of a spherical outer peripheral surface and a curvature center of a spherical inner peripheral surface of the cage are not offset in the axial direction, and the cage has a uniform thickness.

At the time of processing, the steel pipe made of carbon steel, which was used in Example 1, had an increased carbon content, and hence the hardness of the steel pipe was increased. An optimum cutting tool was selected from among commercially available cutting tools, and an optimum material was also selected from among commercially available materials as a material for a window (pocket) formation punch. Thus, the life of each of the cutting tool and the punch used for the processing of Example 1 was at a level equal to that of Comparative Example using the steel pipe made of low-alloy steel, and the processing was able to be carried out easily.

Figure 11:
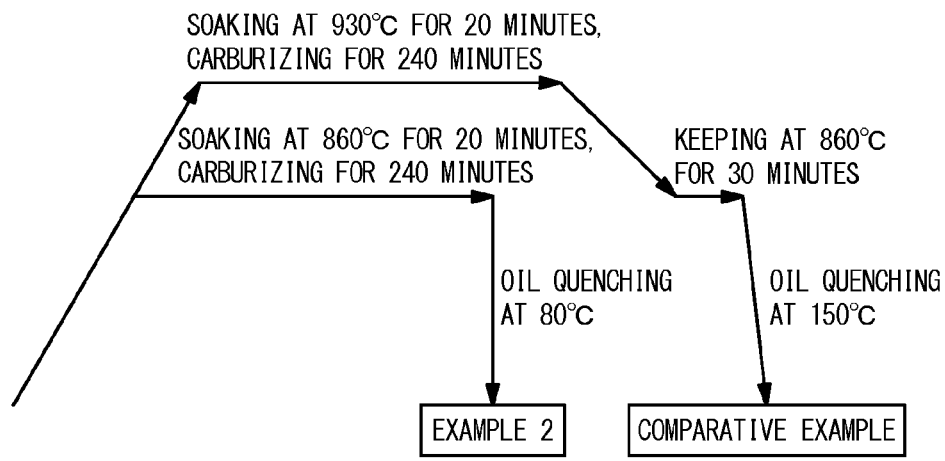
FIG. 11 is a schematic view illustrating carburizing conditions of Example and Comparative Example.
Figure 12:
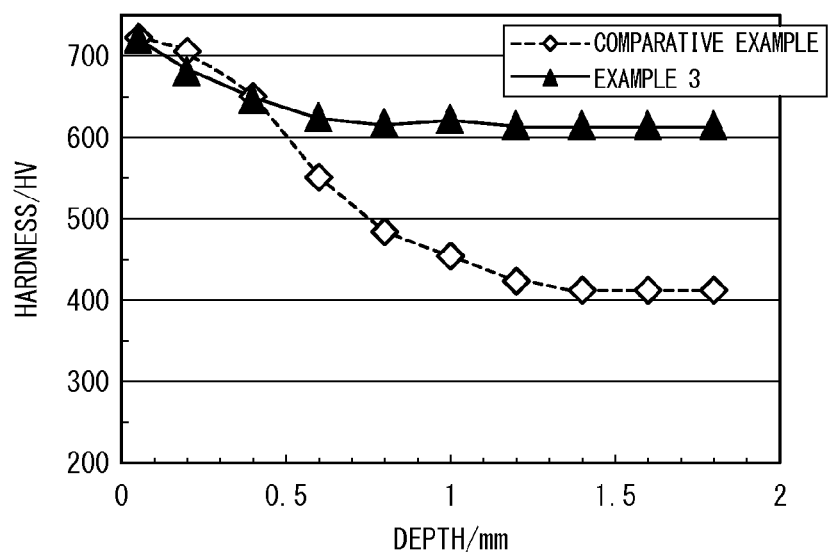
FIG. 12 is a graph showing measurement results of hardness of each of columnar portions of cages of Example and Comparative Example.
Figure 13:
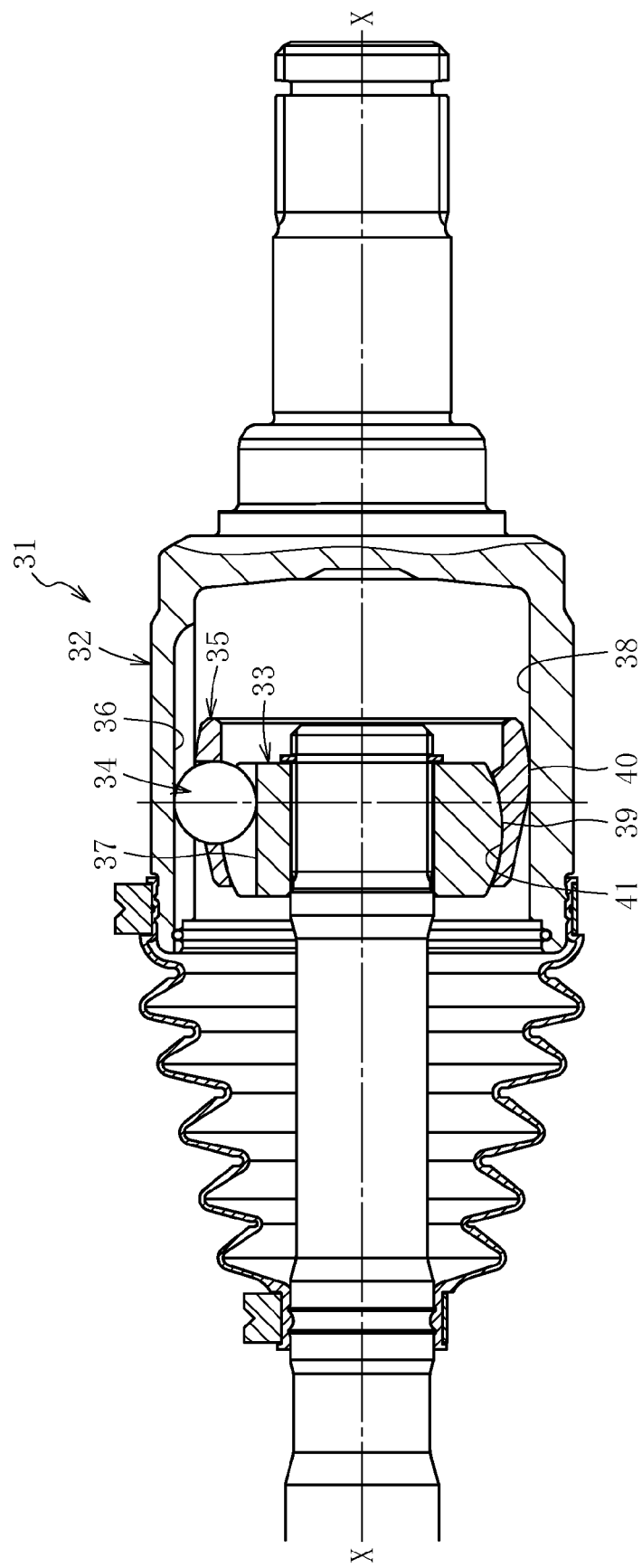
FIG. 13 is a longitudinal sectional view of a plunging type constant velocity universal joint, for illustrating findings in a verification process to arrive at the present invention.
Figure 14:
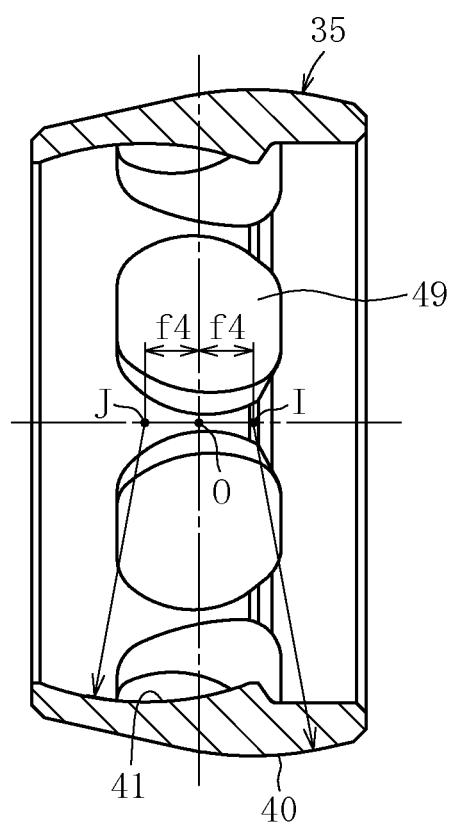
FIG. 14 is a longitudinal sectional view of a cage of the constant velocity universal joint of FIG. 13.
Figure 15:
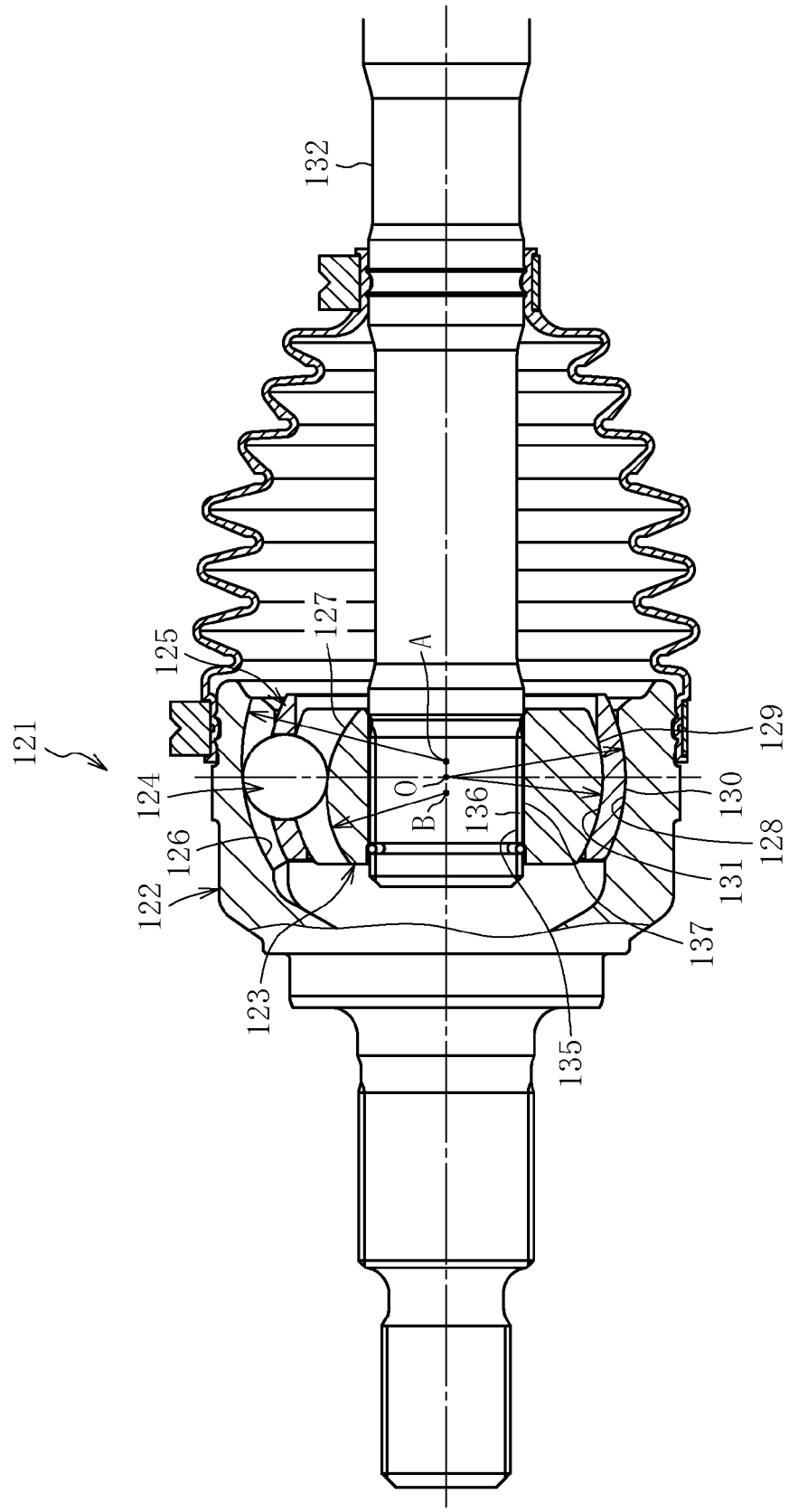
FIG. 15 is a longitudinal sectional view illustrating a related-art fixed type constant velocity universal joint.

Table 1 shows conditions for the carburizing, quenching, and tempering. Characteristic values after the carburizing, quenching, and tempering in Table 1 are measurement results of hardness of a cross section taken at a carburized case-hardened part of the columnar portion 22 of the cage 5 illustrated in FIGS. 3 and 4. In Table 1, quenching oil of JIS Class 1, No. 1 and quenching oil of JIS Class 2, No. 2 are defined in conformity with JIS K 2242. Tempering conditions are 180° C. and 120 minutes. FIG. 11 schematically illustrates carburizing conditions of Comparative Example and Example 2. Further, FIG. 12 illustrates measurement results of hardness of a cross section taken at a carburized case-hardened part of each of the columnar portions of the cages of Comparative Example and Example 3. In Example 1 and Example 2, the same material was used and the same carbon potential (hereinafter referred to as "CP") of carburizing was set. Under those conditions, cages having different total case depths were manufactured as Example 1 and Example 2 with their carburizing times set different from each other. In Example 3, the same material as that of Example 1 was used and the CP at the time of carburizing was increased (CP: 0.75 mass %). Under those conditions, a cage increased in carbon concentration in the surface after the carburizing was manufactured as Example 3.

TABLE 1

| | Carburizing conditions | | | | Total case depth | Hardness (HRC) | |
| --- | --- | --- | --- | --- | --- | --- | --- |
| | Soaking | Carburizing CP (mass %) | Quenching | Quenching oil Temperature | (effective case depth: 50 HRC) (mm) | Surface (Carburizing amount: mass %) | Core |
| Example 1 | 860° C. × 20 minutes | 860° C. × 70 minutes 0.75 | — | JIS Class 1, No. 1 80° C. | 0.25 | 58 (0.58) | 56 |
| Example 2 | 860° C. × 20 minutes | 860° C. × 240 minutes 0.75 | — | JIS Class 1, No. 1 80° C. | 0.55 | 59 (0.65) | 56 |
| Comparative Example | 930° C. × 20 minutes | 930° C. × 240 minutes 1.0 | 860° C. × 30 minutes | JIS Class 2, No. 2 150° C. | (0.70) | 61 (0.85) | 42 |

The cage of each of Example 1, Example 2, Example 3 and Comparative Example was matched with balls, an outer joint member, and an inner joint member, and other components were assembled thereto, to thereby assemble a fixed type constant velocity universal joint. Using the constant velocity universal joint, a strength test and a life test were conducted. In each of Examples and Comparative Example, the tests were conducted on four samples. Table 2 shows results of comparative evaluation based on average values.

TABLE 2

| | Quasi-static torsional test Operating angle: 44°, number of revolutions: 4 rpm Fracture torque | Rolling life test Operating angle: 8°, torque: 1,000 Nm, number of revolutions: 200 rpm Abrasion amount (depth) of side surface portion of pocket of cage after operation for 500 hours |
|---|---|---|
| Example 1 | Increased by 15% | Comparable |
| Example 2 | Increased by 6% | Comparable |
| Example 3 | Increased by 3% | Comparable |
| Comparative Example | Reference | Reference |

[Strength Test (Quasi-Static Torsional Test)]

As a result of the test, assuming the strength of Comparative Example to be a reference, the strength was increased by 15% in Example 1, 6% in Example 2, and 3% in Example 3. The reason why the strength was increased is conceivably because the cage of each of Example 1, Example 2, and Example 3 had a lower carbon concentration in the surface layer than the cage of Comparative Example so that the core hardness was increased.

[Rolling Life Test]

As a result of the test, assuming the rolling life of Comparative Example to be a reference, the results of Example 1, 2, and 3 were comparable to that of Comparative Example. The reason why the rolling life was comparable to that of Comparative Example is conceivably because the core hardness was increased so as to achieve reinforcement by an amount corresponding to the reduction in surface hardness.

As understood from the carburizing conditions of Table 1 and FIG. 11, in Example 1 and Example 2 using carbon steel, the carburizing temperature is lower than that of Comparative Example, and the period of time required for heating and cooling is shorter than that of Comparative Example. Further, the carburizing time can be shortened as compared to Comparative Example using carburizing steel. Thus, it was confirmed that the heat treatment cost was reduced and the productivity was improved.

In FIG. 12, the total case depth is such a depth that the hardness is increased from the core hardness of 615 HV. In Example 3, in which the CP at the time of carburizing was increased (CP: 0.75 mass %) so as to increase the carbon concentration in the surface after the carburizing, the carbon concentration in the surface layer is lower than that of Comparative Example, and hence the toughness of the surface is increased. Thus, even when the case depth is increased, the strength is not reduced significantly. Therefore, the total case depth can be increased so that the upper limit can be raised to 0.75 mm.

In the above-mentioned embodiments, the Rzeppa constant velocity universal joint and the undercut-free constant velocity universal joint are described as the fixed type constant velocity universal joints incorporating the cage, and the cross groove constant velocity universal joint is described as the plunging type constant velocity universal joint, but the present invention is not limited thereto. In addition to the above-mentioned constant velocity universal joints, the present invention is also applicable as appropriate to a cross-groove type constant velocity universal joint, a counter-track type constant velocity universal joint, and the like as the fixed type constant velocity universal joints. Further, the constant velocity universal joint comprising six or eight balls is described, but the present invention is not limited thereto, and may also be carried out in a case of three to five, eight, ten balls or more.

In addition, in the above-mentioned embodiments, the track grooves and the balls are held in angular contact at a contact angle, but the present invention is not limited thereto. The track grooves and the balls may be held in circular contact by forming the track grooves into a circular shape in horizontal cross section.

Further, the present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1, 61, 91 constant velocity universal joint
2, 62, 92 outer joint member
3, 63, 93 inner joint member
4, 64, 94 torque transmitting ball
5, 65, 95 cage
6, 66, 96 track groove
7, 67, 97 track groove
10, 70, 100 spherical outer peripheral surface
11, 71, 101 spherical inner peripheral surface
12, 102 shaft
20, 80, 110 pocket
23, 83, 113 side surface
A curvature center
B curvature center
E curvature center
F curvature center
G curvature center
H curvature center
K window dimension
O joint center
X joint axial line
f1 offset amount
f2 offset amount
f3 offset amount

The invention claimed is:

1. A cage for a constant velocity universal joint, which is formed into a ring shape with a substantially uniform thickness, comprising a plurality of pockets formed in a circumferential direction of the cage, for receiving torque transmitting balls, respectively, the cage being formed of carbon steel comprising 0.41 to 0.51 mass % of C, 0.10 to 0.35 mass % of Si, 0.60 to 0.90 mass % of Mn, 0.005 to 0.030 mass % of P, and 0.002 to 0.035 mass % of S, with the balance being Fe and an element inevitably remaining at the time of steelmaking and refining, the cage being subjected to carburizing, quenching, and tempering as heat treatment, each of the plurality of pockets having a side surface finished after the heat treatment, wherein the cage has a surface layer which is formed by the heat treatment and a core, the surface layer having a surface hardness of 58 HRC or more and a carbon concentration of 0.55 to 0.75 mass %, and the core having a core hardness of from 56 to 59 HRC.

2. The cage for a constant velocity universal joint according to claim 1, wherein the cage has a spherical outer peripheral surface and a spherical inner peripheral surface, and wherein the cage has the substantially uniform thickness so that an axial offset amount between a curvature center of the spherical outer peripheral surface and a curvature center of the spherical inner peripheral surface is less than 1 mm.

3. The cage for a constant velocity universal joint according to claim 1, wherein the carbon steel for forming the cage comprises 0.42 to 0.48 mass % of C.

4. The cage for a constant velocity universal joint according to claim 1, wherein a total case depth of the surface layer is set to 0.25 to 0.55 mm.

5. A constant velocity universal joint, which incorporates the cage for a constant velocity universal joint according to claim 1.

6. A drive shaft, which incorporates the constant velocity universal joint according to claim 5.

7. The cage for a constant velocity universal joint according to claim 2, wherein the carbon steel for forming the cage comprises 0.42 to 0.48 mass % of C.

8. The cage for a constant velocity universal joint according to claim 2, wherein a total case depth of the surface layer is set to 0.25 to 0.55 mm.

9. A constant velocity universal joint, which incorporates the cage for a constant velocity universal joint according to claim 2.

* * * * *